United States Patent [19]

Kmetz et al.

[11] 4,005,928
[45] Feb. 1, 1977

[54] NEMATIC LIQUID CRYSTAL DISPLAYS FOR LOW VOLTAGE DIRECT CURRENT OPERATION

[75] Inventors: Allan Robert Kmetz, Richardson; Linda Truitt Creagh, Argyle, both of Tex.

[73] Assignee: Texas Instruments Incorporated, Dallas, Tex.

[22] Filed: Aug. 1, 1973

[21] Appl. No.: 384,651

Related U.S. Application Data

[63] Continuation of Ser. No. 148,763, June 1, 1971, abandoned.

[52] U.S. Cl. .......................... 350/160 LC; 252/299
[51] Int. Cl.² ........................................... G02F 1/13
[58] Field of Search ............ 350/160 LC; 252/299, 252/408

[56] References Cited

UNITED STATES PATENTS

| | | | |
|---|---|---|---|
| 3,499,112 | 3/1970 | Heilmeier et al. | 350/160 LC |
| 3,575,491 | 4/1971 | Heilmeier | 350/160 LC |
| 3,614,210 | 10/1971 | Caplan | 350/160 LC |

*Primary Examiner*—Edward S. Bauer
*Attorney, Agent, or Firm*—Harold Levine; James T. Comfort; William E. Hiller

[57] ABSTRACT

A low current d.c. operated liquid crystal display comprises a liquid crystal material composition having impurities therein to effect a current density at 25° C in the range of 0.5 to 3.0 $\mu a/cm^2$. In one aspect of the invention, the liquid crystal composition is provided by purifying the material to 99.95 percent or greater and then adding controlled amounts of preselected impurities so that the total amount of impurities in the liquid crystalline composition comprises ½ to 2 percent by weight. In another aspect of the invention, the liquid crystalline material is initially prepared so that it has a purity in the range of 98.0 to 99.5 percent by weight. An adsorbed layer may be formed on the electrodes to enhance electrical charge injection. In one specific embodiment, the liquid crystalline composition is utilized to form a display panel that is directly compatible with 12 volts d.c., which is typically available in automotive vehicles. In a different embodiment, the liquid crystal cell is utilized to form an electronically dimable mirror.

1 Claim, 8 Drawing Figures

INVENTORS
Allan R. Kmetz
Linda T. Creagh

Richard L. Donaldson

ATTORNEY

NEMATIC LIQUID CRYSTAL DISPLAYS FOR LOW VOLTAGE DIRECT CURRENT OPERATION

This is a continuation, of application Ser. No. 148,763, filed June 1, 1971, now abandoned.

The present invention pertains to display devices in general and more specifically to liquid crystalline displays that are responsive to relatively low d.c. excitation voltages.

The three common states of matter are the solid, liquid and gas, in which the randomness of geometrical arrangement of the molecules increases from the solid to the liquid to the gas. The gas and the ordinary liquid are both isotropic, having the same physical properties in all directions. The solid may be amorphous, in which case the geometrical arrangement of the molecules is random, but the molecules are sufficiently bound so they are unable to move with respect to each other. Most inorganic and organic solids are found to be crystalline; that is, their molecular units are arranged in a regular repeating geometrical pattern known as a lattice unit. Many crystalline solids are anisotropic in that their physical properties vary, depending upon the direction of measurement with respect to different crystal axes. For most pure substances, the transition temperature between the solid state and the liquid state is quite sharp.

Certain organic solid compounds, however, exhibit a peculiar behaviour such that when heated they melt at a specific temperature, producing a turbid melt that changes abruptly to a clear isotropic liquid at a higher threshold temperature. In the temperature range between the solid and the isotropic liquid, these compounds are anisotropic with respect to transmission of light. The characteristics of these compounds are thus partly those of the isotropic liquid since they exhibit liquid flow. These materials are therefore often called "liquid crystals" or, more accurately, "crystalline liquids". These materials are sometimes classified as a fourth state of matter referred to as the mesomorphic state or mesophase. That is, a state or phase intermediate that of the anisotropic crystal and that of the isotropic liquid.

There are essentially two major classes of liquid crystals, the "nematic" state and the "smectic" state. Material having the nematic mesomorphic state frequently assume the characteristics of a thread-like texture when a thin section of the material is viewed between crossed polaroids. The nematic liquid crystal materials generally consist of rod-shaped molecules which tend to align parallel to a common direction resulting in an isotropy of many of the bulk properties. When the alignment, either horizontal or vertical, is uniform, the sample is optically clear. As used hereafter, when a thin layer of nematic material is confined between plane parallel surfaces such that the molecules are aligned in a single direction parallel with the surfaces, the material will be termed horizontally aligned. Conversely, vertical alignment will be used to refer to molecular alignment perpendicular to the major confining surfaces. As previously mentioned, when the alignment of the molecules is uniform, the liquid crystalline material is optically clear. However, when an electrical current is passed through a thin nematic layer, it disrupts the uniform alignment and causes scattering or refraction of incident light. This phenomenon is termed dynamic scattering. Hydro-dynamic flow caused by motion of entrained charge carriers in response to the applied electric field plays a major role in disrupting the alignment in horizontal alignment, but has only a minor affect on vertical alignment.

The dynamic scattering of liquid crystal in response to a voltage applied thereacross is useful in many electro-optical devices, such as alphanumeric displays, light valves, etc. Such devices are disclosed in more detail in U.S. Pat. No. 3,322,485 issued to R. Williams May 30, 1967.

The smectic state is characterized as the most highly ordered state of liquid crystals. Materials of this type do not exhibit many of the useful optical properties characteristic of the nematic state. Specifically, they do not exhibit "dynamic scattering" in response to an electric field. On the other hand, smectic materials are desirable in that they exhibit a very low crystal to mesomorphic transition temperature and often exist in the mesomorphic state at room temperatures. Mixtures of smectic and nematic materials may be produced, however, which are effective to produce dynamic scattering at room temperatures. Examples of such mixtures are provided hereinafter.

A major problem association with liquid crystalline display devices to date pertains to the nature of excitation voltage required in order to produce dynamic scattering. Generally, it has been observed that in order to produce display devices having acceptable contrast ratios and operating lifetimes, an alternating current in the range of 30–70 volts is required. There are many applications, however, wherein it is desirable to utilize relatively low d.c. voltages to provide the excitation of the liquid crystal display. This provides several advantages. For example, direct current operation at very low current would enable use of battery power without an inverter. Further, since most kinds of electronic switches that might be used to control a liquid crystal display are unilateral and thus not well-suited to switch alternating current, d.c. operation enables simpler and less expensive drive circuitry to be utilized. An area in which an acute need exists for a liquid crystal display that is responsive to relatively low d.c. voltages is the automotive vehicle industry, since liquid crystalline displays that have been proposed for automotive uses to date have required a d.c. to a.c. converter to provide the 50 volts a.c. required to energize conventional liquid crystal displays.

Accordingly, an object of the present invention is to provide a liquid crystal display that is responsive to relatively low d.c. excitation voltages.

A further object of the invention is to provide a liquid crystal display having improved lifetime characteristics.

Another object of the present invention is to provide a liquid crystal display directly compatible with the d.c. voltage source of automotive vehicles.

An additional object is to provide an electronically dimmable mirror that incorporates a liquid crystal cell responsive to d.c. voltages in the range of 7–15 volts.

Briefly, in accordance with the present invention, a liquid crystal display responsive to relatively low d.c. excitation voltages is provided. A low d.c. voltage dynamic scattering threshold is provided by preparing a liquid crystal composition to have a current density at 25° C in the range of 0.5 to 3.0 $\mu a/cm^2$. The liquid crystalline composition may be prepared to have this conductivity by initially purifying the material so that it contains impurities in the range of ½ to 2 percent by weight. Alternatively, the liquid crystalline material may be purified to 99.95 percent or greater and selected impurities or dopants added to produce the required conductivity range.

In one embodiment of the invention, an adsorbed layer is formed on the electrodes to enhance charge insertion. Added impurities may be selected not only to lower the d.c. dynamic scattering threshold, but also to minimize the deleterious effects of certain electrochemical reactions during d.c. operation and thereby maximize operating lifetime.

Figure 1:
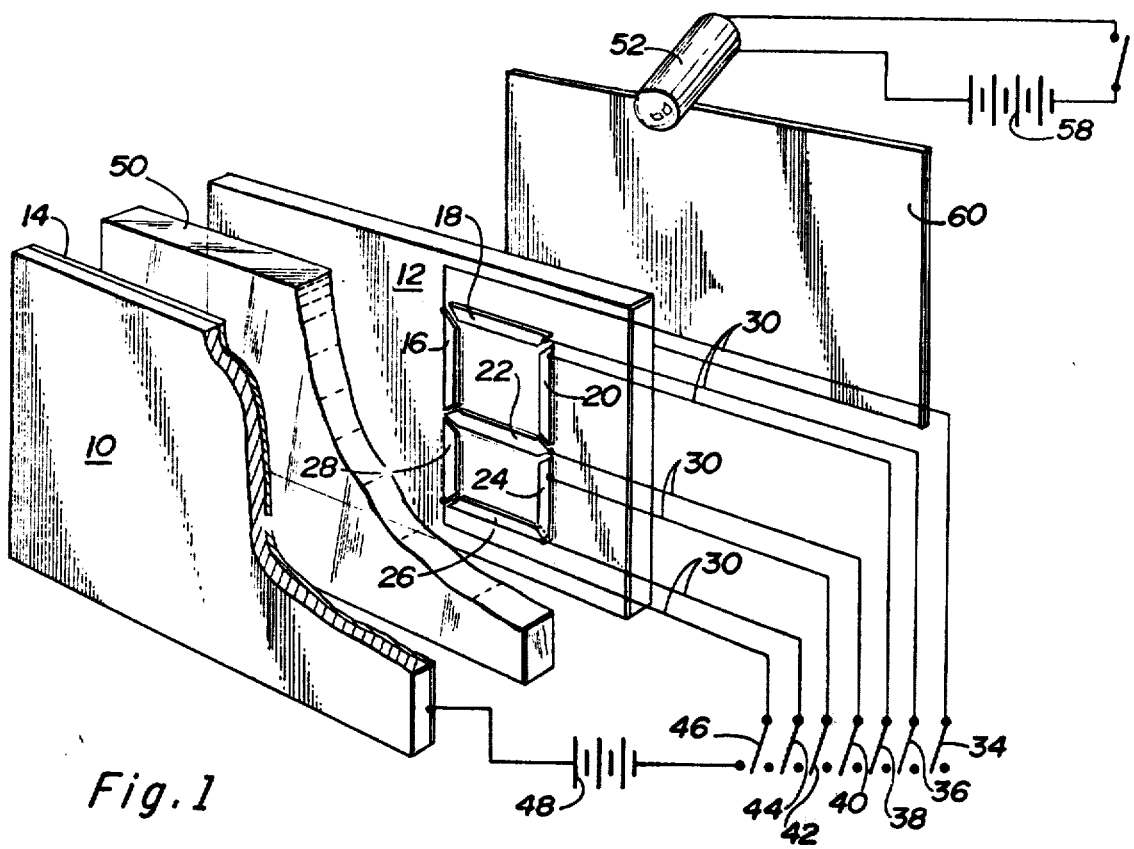
FIG. 1 is an exploded schematic view of a display device utilizing the composition of the present invention.

Referring to FIG. 1, two substrates or plates 10 and 12 are positioned substantially parallel to each other. Substrate 10, shown partially broken away, is optically transmissive and has deposited on a face thereof a coating 14 of a material which is optically transmissive and electrically conductive. Substrate 12 is also optically transmissive and has coated thereon, by way of example, a plurality of electrically insulated electrodes 16, 18, 20, 22, 24, 26 and 28. These electrodes are also optically transmissive and electrically conductive. Each of the electrodes 16 through 28 has attached thereto a lead 30 which is optically transmissive and which has been electrically insulated by an optically transmissive insulating composition. The leads 30 are connected to switches 34, 36, 38, 40, 42, 44 and 46 which correspond respectively to specific ones of electrodes 16–28. Switches 34–46 are connected in parallel to a source 48 of electrical energy which is connected in series to electrically conductive coating 14.

Interposed between substrates 10 and 12 is a thin layer 50 of a liquid crystal composition which has dynamic scattering threshold characteristics responsive to relatively low d.c. voltages. As explained hereinafter, any nematic liquid crystalline material may be modified so that it is responsive to d.c. excitation voltages by controlling the purity level of the material.

For purposes of clarity, in the exploded view of FIG. 1, the thin layer 50 is shown separated from the substrates 10 and 12; however, in operation, the thin layer 50 is intimately in contact with the coating 14 and the electrodes, such as 16–28, formed on the surface of the substrate 12. A light source 52 is positioned behind substrate 12 to direct a light beam at an angle toward the rear face of substrate 12. Since both of the substrates 10 and 12 and the electrodes and coating thereon are optically transmissive, the light beam from source 52 normally passes through the display cell. The source of light 52 is electrically connected to a suitable electrical energy source 58 and may be any conventional light source including an incandescent source. A non-reflective light absorbing plate 60, which is preferably a dull black in color, may be positioned behind and spaced from the substrate 12 to improve efficiency.

Figure 2:
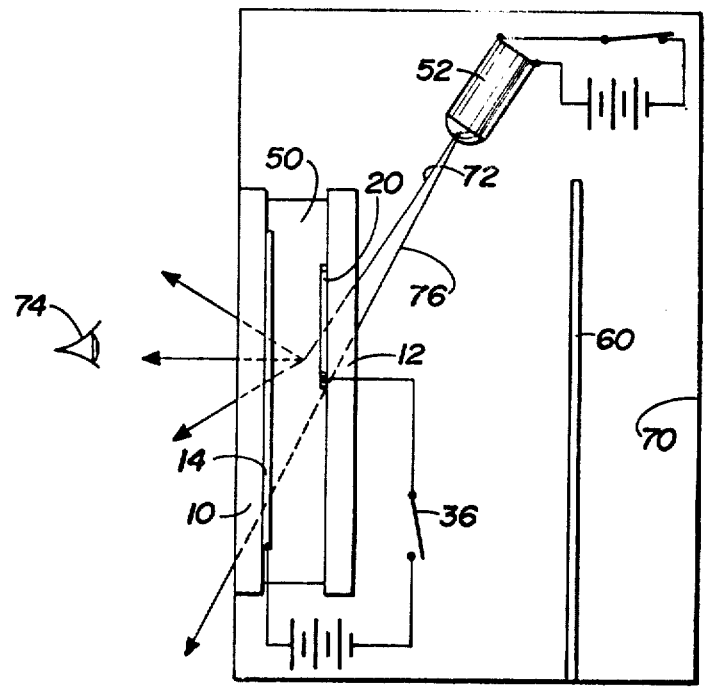
FIG. 2 is a side view of a device similar to that shown in FIG. 1.

Operation of the display device will be described with reference to FIG. 2 wherein there is a side view of the display device shown in FIG. 1. For clarity of description, only one electrode 20 of electrodes 16–28 is illustrated. The display device is shown enclosed by a suitable casing 70. As may be seen, the thin layer 50 of the mesomorphic composition contacts the electrically conductive coating 14 and electrode 20. When switch 36 is closed, a voltage is impressed across the layer 50 between electrode 20 and that portion of coating 14 corresponding thereto. This voltage causes the portion of layer 50 to which the voltage is impressed to diffuse light coming from light source 52. For purposes of illustration, light beam 72 is shown being diffused toward the eye 74 of an observer. A second representative light beam 76 passes through the portion of the mesomorphic composition across which no voltage is impressed without being diffused. Thus, the observer is unable to see light from the light source in that portion of the layer. Plate 60 may be provided to eliminate internal reflections from the light source 52 and also to eliminate stray room light which may interfere with the display characteristics of the display screen.

With reference again to FIG. 1, it may be seen that if switches 34 and 46 are energized, a voltage will be impressed across layer 50 in that portion of the layer corresponding to electrodes 16 and 28. An observer, such as observer 74 of FIG. 2, will see a numeral 1 displayed. Similarly, if all of the switches 34–46 are closed, the observer will see a numeral 8 displayed.

Figure 3:
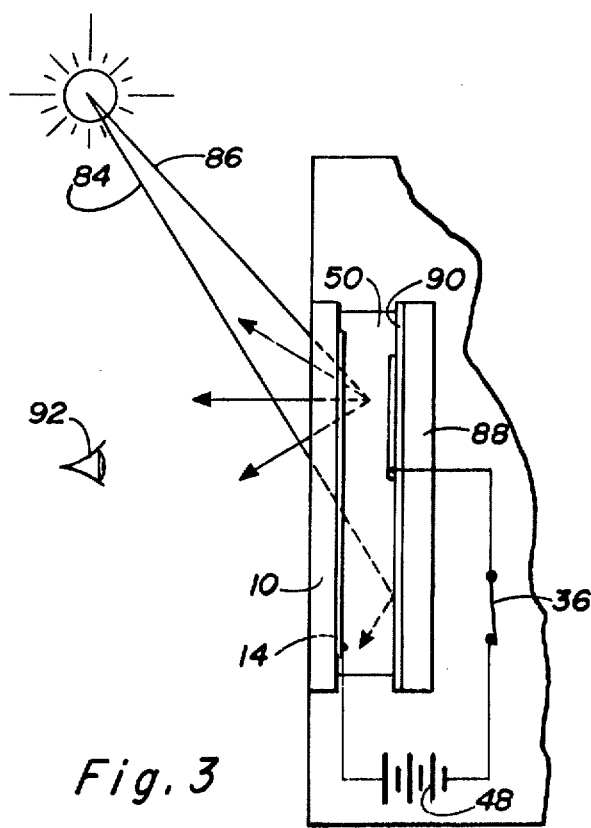
FIG. 3 is a side view of another embodiment of the display device of the present invention.

In FIG. 3, a different embodiment of the present invention is illustrated. In this embodiment, the optically transmissive substrate 10 and optically transmissive and electrically conductive coating 14 are constructed the same as above. A light source 80 exterior to the casing 70 directs light beams 84 and 86 toward the mesomorphic layer 50. In this embodiment, substrate 88 need not be optically transmissive. Contacting substrate 88 is a reflective coating 90 onto which an electrode, such as 20, is formed. Similar to the foregoing embodiment, the electrode 20 is electrically connected to switch 36 which is operable to impress an energy source 48 across electrode 20 and coating 14. In this embodiment, light from source 80, for example, light beam 86, strikes the nematic mesomorphic layer 50 in an area across which a voltage is impressed. The light is diffused by layer 50 and is reflected back toward the observer 92 by the reflective coating 90. Light beam 84, on the other hand, does not traverse a portion of the layer 50 across which an electrical field has been impressed and is therefore reflected by coating 90 away from the observer 92. Thus, as above, the observer 92 will see a display corresponding only to the size and shape of the electrode 20. Light source 80, in this embodiment, need not be an artificial source, but may be any available source including sunlight.

The electrical energy or impressed voltage across the layer 50 must be sufficiently large to reach or exceed a threshold voltage at which the mesomorphic composition will scatter light. It has been discovered that for layers having a thickness up to about 1 mil, the threshold voltage for most compositions occurs at around 7 volts while preferably a voltage on the order of 20 volts is utilized. It is important, however, as will be explained hereinafter, that the purity of the composition be controlled in order to obtain desired results. For best results, it has been found that the layers should be relatively thin, preferably less than 20 micrometers. The substrates 10 and 12 may be composed of any suitable material which is optically transmissive. For example, various types of glass, fused quartz, transparent varieties of corundum and transparent plastics or resins may be used. The coating and electrodes which are both electrically conductive and optically transmissive such as coating 14 and electrodes 16–28 may be composed of, for example, layers of indium oxide or tin oxide deposited on the surface of the respective substrates. If a reflective surface is desired, a thin layer of a metallic material such as silver or aluminum may be deposited on the substrate, such as coating 90 on substrate 88. It is to be understood, of course, with reference to FIG. 3, that the reflective coating 90 may be placed either at the front or rear of the substrate 88, but if placed on the front of substrate 88 as shown in FIG. 3, it must be electrically insulated from the electrode 20 to give the desired display effect. An alternate means of producing the desired reflection is to eliminate the coating 90 and compose the electrode 20 of a suitable reflective and conductive material.

To produce a display that is responsive to low d.c. voltages, the manner in which the liquid crystalline composition is prepared is important. For example, applicants have discovered that the level of impurities in the liquid crystalline composition is an important consideration. Applicants have constructed liquid crystal displays having the desired optical characteristics using liquid crystalline materials that are pure to a level of 95 percent by weight. These displays have an extremely short lifetime, however, generally less than 500 hours at 15 volts d.c. On the other hand, these same materials purified to 99.5 percent or greater do not exhibit sufficient d.c. scattering for display purposes. Such materials, however, do exhibit long lifetimes under d.c. bias. One of the important features of the present invention is the discovery of the importance of the purity levels of the liquid crystalline materials required to produce the desired low d.c. voltage dynamic scattering threshold and adequate lifetime characteristics.

In one aspect of the invention, the liquid crystalline material is synthesized and purified to the desired level of purity. Procedures for synthesizing and purifying two different liquid crystalline materials are given in Examples 1 and 2 below. Liquid crystal displays utilizing these materials have the desired low d.c. voltage threshold and exhibit the required lifetime characteristics and contrast ratios.

EXAMPLE 1

Liquid crystalline material 4'-methoxybenzylidene-4-butylaniline, hereinafter MBBA, was synthesized by procedures well-known to those skilled in the art. Details of representative procedures may be found in H. Kilker et al, Angew. Chem. Int. Ed. 8 (11), 884 (1969). The liquid crystalline material was purified as follows. The water and solvent were stripped off under vacuum and then the material was heated under vacuum. A vacuum of 0.05 Torr was used. The material was heated to 120° C. During this process, some p-anisaldehyde and p-n-butylaniline distilled over. Subsequently, the liquid crystal material was distilled in an adiabatic still with a Teflon or stainless steel spinning band. The fractionation ratio was set at 5 to 1 and the fraction coming over at 140 to 150° C, $10^{-5}$ Torr was retained. This material analyzed, by gas chromophotography, to be 98.5 ± 0.5 percent MBBA with the major impurities believed to be the starting aldehyde and amine. The nematic to isotropic temperature was in the range of 42° C to 45° C.

EXAMPLE 2

The liquid crystalline material 4'-ethoxybenzylidene-4-butylaniline, hereinafter EBBA, was synthesized by the procedure above outlined and purified in a manner similar to the MBBA given in EXAMPLE 1. The fraction used was taken at 150° to 160° C, $10^{-5}$ Torr. This material analyzed, to be 98.5 percent ± 0.5% EBBA with the starting materials as the major impurities. The solid to nematic transition temperature occurred at approximately 35° C while the nematic to isotropic transition occurred in the range of 72°–75° C.

Preferably, a mixture of 60% mole MBBA to 40% mole EBBA is utilized to obtain a desired temperature range for the nematic phase. It is understood, of course, that either of the materials alone or any combination or ratios of the two may be utilized to obtain desired characteristics.

In some applications, it may be desirable to prepare the liquid crystalline materials to a very pure state and then add selected impurities or other liquid crystalline materials not as pure to produce a composite mixture having impurities in the range of ½ to 2% by weight of the mixtures. For example, either the liquid crystalline material EBBA or the material MBBA above mentioned may be purified to 99.95% or greater purity. Then, either MBBA by itself or a mixture of EBBA with MBBA of high purity may be mixed with a third liquid crystalline material that is not as pure. For example, liquid crystalline material p-(t-Ethoxyphenylazo) phenyl heptanoate, which is commercially available from Eastman Kodak, analyzes by gas chromographic analysis to be about 98% pure. This commercially available liquid crystalline material may be added to highly purified EBBA or MBBA or a combination thereof to provide a resultant mixture wherein the total impurity, by weight, is on the order of ½ to 2%. Such a liquid crystalline material has the desired low d.c. voltage excitation threshold and lifetime characteristics.

Additionally, the aforementioned liquid crystalline available from Eastman Kodak may be recrystallized by techniques well-known in the art from absolute ethanol or hexane to yeild a higher purity material in the range of 99.4 to 99.6% pure. This material would be suitable for use in compounding with EBBA and/or MBBA or other liquid crystalline materials that are not purified to an extremely high level of purification. For example, it may be desirable to mix this material with EBBA purified to 99.0%. One reason it may be desirable to form such a mixture is the fact that the Eastman Kodak material has a very high nematic temperature range and this is effective to raise the nematic temperature range of the mixture.

In another embodiment of the invention, liquid crystalline materials are purified to a high level and then preselected electrical conductivity affecting impurities are added to produce a resultant liquid crystalline material that has a current density at 25° C that is in the range of 0.5 to 3.0 $\mu$ a/cm$^2$ in a 12 micrometer cell at 15V d.c. Generally, impurities totaling from ½ to 2% by weight of the composition is effective to produce the desired conductivity. A wide variety of dopants may be utilized, the only requirements being that the dopant increase the conductivity of the composition, and have non-interfering chemical reactivity and suitable electrochemical behavior with the liquid crystalline material. For example, dopants that would cause a Shiff base to break down, such as strong organic acids or strong organic bases, or halogenating agents, or acylating agents would not be utilized. Dopants with less electrochemical reactivity than the liquid crystalline material themselves are desirable. Exemplary dopants that are useful include those that act as hydrogen donors to electrochemically produced intermediates such as, for example, p-hydroquinone; 2,2',4,'-tetrahydroxybenzopheone; 2,4-dihydroxybenxophenone; 2-hydroxy-4-methoxybenzophenone; and benzoin. Other suitable dopants include that class of materials that act as ion donors and which are inactive chemically and electrochemically with the liquid crystalline material such as, for example, p-anisic acid; p-ethoxybenzoic acid; and 2-dodecylisoquinolinium bromide. Other examples of suitable dopants include p-anisaldehyde and p-ethoxybenxaldehyde, available commercially from Eastman-Kodak and freshly distilled p-n-butylaniline. Preferably, available from Aldrich Chemical Company. Preferably, the dopant levels are held to no more than about 2% of the total material weight since the display lifetime and operating temperature range are affected at higher impurity levels.

In general, the suitability of a hydrogen donor for the liquid crystals system will be determined by two factors:

1. the basicity of the proton acceptor, and
2. the stability of the conjugate base formed by the donation of a proton.

Preliminary electrochemical data indicate that the initial radical species formed is a radical anion. Generally such radical anions are considered to be strong bases capable of abstracting protons from even very weak acids. In this case of para-disubstituted Schiff bases, the radican anion appears to be rather stable with respect to coupling reactions. As a result, the half-life of the radical anion, in the absence of proton donors is relatively long. This lengthy time constant provides opportunity for this radical anion to react with even weakly acidic materials such as traces of water or minor impurities. The result of such reactions appear on the electrodes as brown deposits. The conjugate base formed in these cases is a reactive species and itself can act as a proton abstractor. Such abstractions further accelerate the net degradation of the liquid crystal.

Addition of small amounts of selected proton donors reduces the side reactions if the donors are chosen such that the conjugate base is a weak base. Generally, the stronger the acid, the weaker its conjugate base. Because strong Bronsted acids can catalyze unwanted side reactions, one needs to select from the large number of Lewis acids that have structures capable of stabilizing negative charge or of maintaining radical aionic form.

Structures capable of stabilizing negative charge or radical anionic forms generally have several common features, namely:

1. Mobility of electrons over a large portion of the molecule. Aromatic or conjugated molecules have this property. Examples are benzene, naphthalene, biphenyl, anthracene, vinyl or acetylene derivatives.
2. Electron-withdrawing substituents to distribute the charge. Some electron-withdrawing substituents are nitro, carbonyl, carboxyl, phenyl, halogen, hydroxyl and vinyl functional groups.

Properly substituted aromatic or conjugated systems with appropriate functional groups can be chosen so that addition to the liquid crystal system provides suitable hydrogen donors but no unwanted side reactions.

Examples of methods for purifying MBBA and EBBA to desired purity levels prior to adding dopants are given in examples 3 and 4.

EXAMPLE 3

Liquid crystalline material MBBA was synthesized and the initial purification effected as described in EXAMPLE 1. The MBBA was finally purified by distillation in an adiabatic still with a stainless steel spinning band. The desired fraction was taken at 140° C, $10^{-5}$ Torr with a pot temperature of about 205° C. The reflux ratio was 50 to 1. This material, by gas chromotographic analysis, was 99.95% ± 0.5 percent pure and had a nematic to isotropic transition at 46.5° to 47° C.

EXAMPLE 4

Liquid crystalline material EBBA was synthesized in a manner similar to EXAMPLE 3. The desired fraction was obtained at 150° C, $10^{-5}$ Torr, with a pot temperature of 210° C. The reflux ratio was 50 to 1. This material, under gas chromotographic analysis, was 99.95 ± 0.5% pure, and had a nematic to isotropic transition temperature of 79° C.

The response of MBBA purified as above described to 99.98% was checked relative to a 10 volt d.c. single pulse input. The response was extremely poor as compared with MBBA having impurities in the range of 1–2%. In fact, display cells filled with MBBA purified to 99.98% exhibit less than 50% of the scattering ability of cells filled with 1–2% p-n-butylaniline doped MBBA. Response time and scatter are best when the added aniline concentration is about 1%. Addition of p-anisaldehyde also markedly improves low voltage behaviour. In the case of doping with aldehyde, at 10 volts, a doping level of 2% by weight appears to be optimum.

Figure 4:
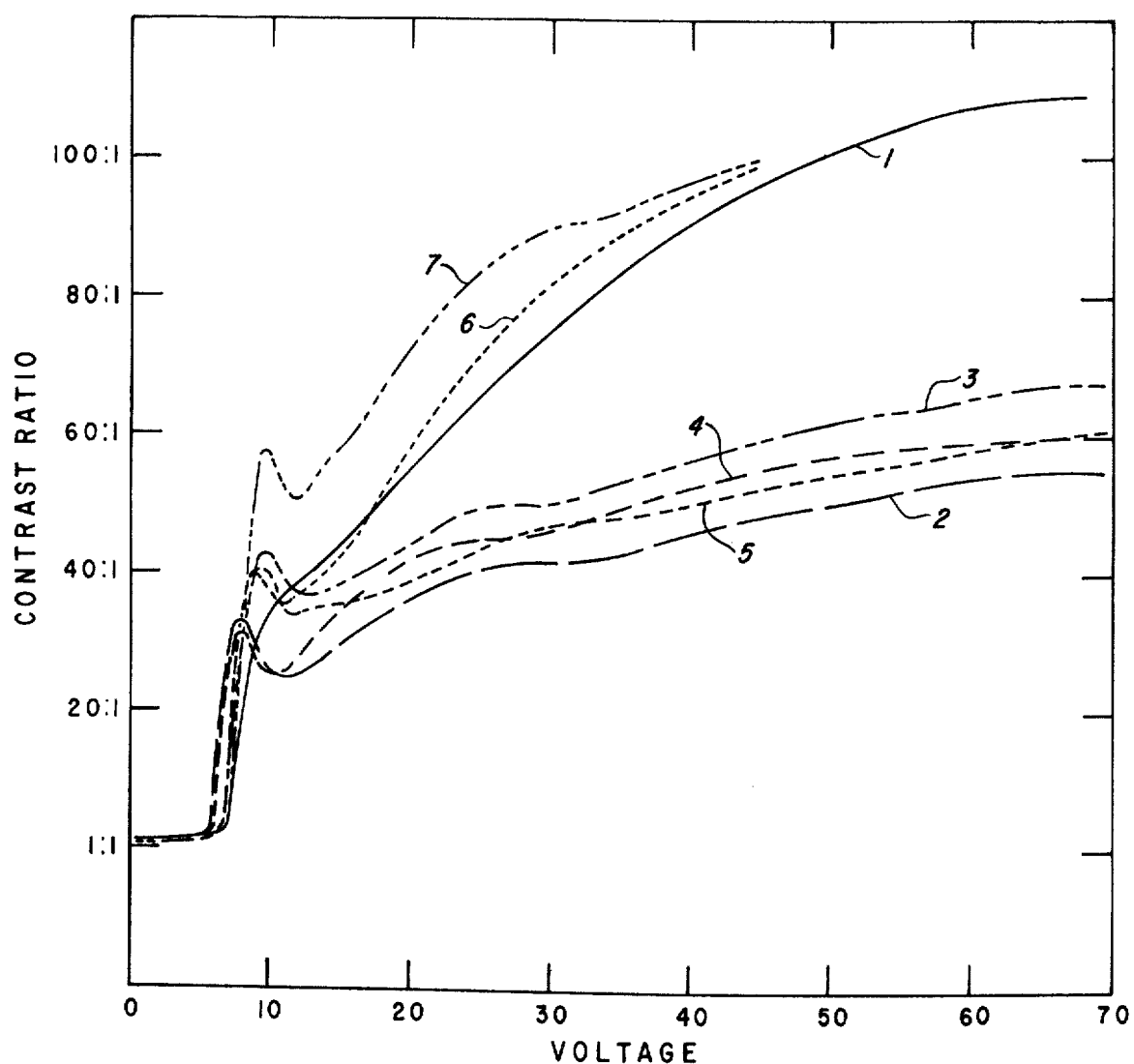
FIG. 4 is a graph of contrast ratio vs. applied voltage for various liquid crystalline compositions.

Various liquid crystalline mixtures have been prepared from EBBA and MBBA compounds prepared in accordance with procedures set forth in EXAMPLE 1. Contrast ratio vs. voltage curves are shown in FIG. 4 for different mixtures of these materials and it may be seen that adequate low voltage operation is achieved.

The addition of impurities to liquid crystalline compositions also affects the nematic to isotropic temperature. This may be seen by reference to TABLE 1, which illustrates the results of adding freshly distilled aniline to 99.98% MBBA. The effect of isotropic transition when p-ethoxybenzaldehyde is added to EBBA are also shown. It may be seen that the nematic to isotropic transition temperature is lowered as the percentage of impurities is increased.

TABLE 1

| MBBA | | EBBA | |
|---|---|---|---|
| % Aniline | Nematic to Isotropic ° C | % Aldehyde | Nematic to Isotropic ° C |
| 0.02 | 46.5 | 0 | 79 |
| 0.10 | 45 | 0.3 | 78 |
| 1.0 | 41 | 2.0 | 73 |
| 2.0 | 38 | 5.0 | 66 |
| 5.0 | 25 | 10.0 | 64 |
| 10.0 | 30 | — | — |

Figure 5:
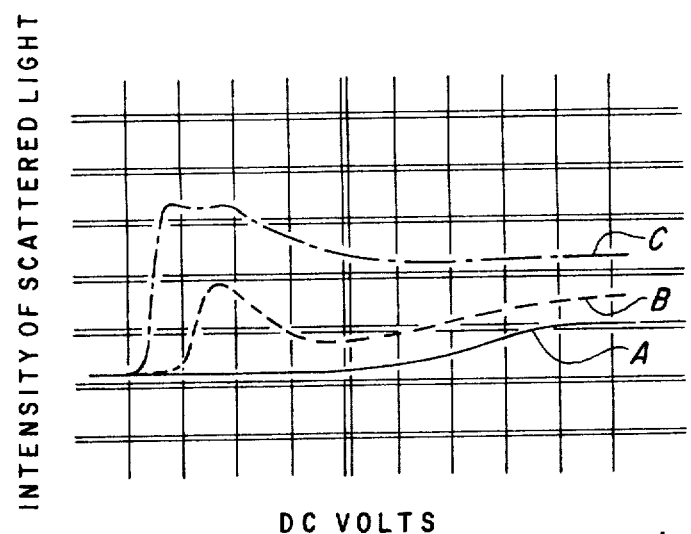
FIG. 5 is a graph of the intensity of scattered light vs. applied voltage for both doped and undoped liquid crystalline materials.

Light scattering efficiency is also affected by the impurity level. As mentioned previously, at very high purity levels, the materials are very inefficient in scattering light and at low d.c. voltage the cell may appear "off", or the cell may scatter light but the response time may be unacceptably long and the threshold may be very vague. The effect of light scattering ability as a function of the percentage of impurity maybe seen by reference to FIG. 5 wherein curve A indicates the response for 99.98% MBBA, Curve B shows response of 99.98% MBBA doped with 2% p-n-butylaniline and Curve C shows 99.98% MBBA doped with 1% p-n-butylaniline. As may be seen, adding impurities or dopants provides a sharp low d.c. voltage threshold on the device.

Liquid crystal mixtures made from materials prepared as indicated in EXAMPLES 3 and 4 and doped with 1–2% aniline or aldehyde have been prepared and tested. For example, a pure mixture of 60% MBBA and 40% EBBA with aniline dopant concentration of about 1% by weight produces the contrast ratio versus voltage curves as shown in FIG. 6 for display cells of different thickness.

Figure 6:
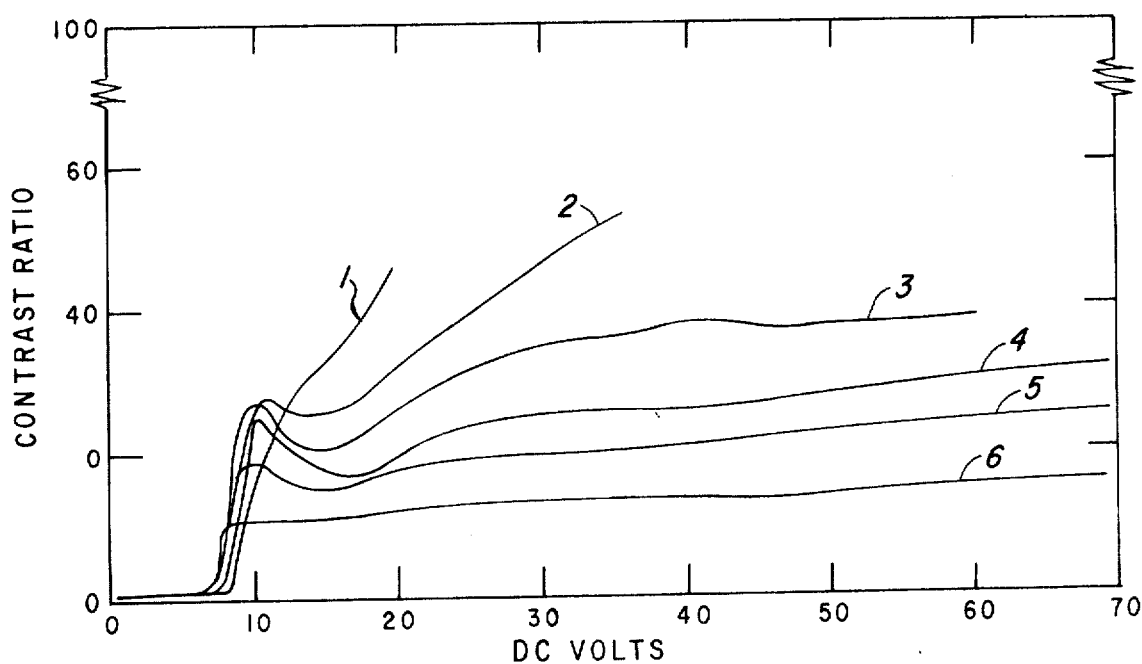
FIG. 6 is a pictorial illustration of a compact calculator that incorporates a liquid crystal display in accordance with the present invention.

In FIG. 6, Curve 1 corresponds to a display cell having a thickness of ¼ mil. Curves 2–6 respectively correspond to display cells having a thickness of ½ mil, 1 mil, 2 mil, 3 mil and 5 mil.

At this juncture, it should be pointed out that d.c. operation of liquid crystal displays necessarily effects a shorter lifetime of the display than a.c. operation because of the electrochemical processes that take place due to the applied d.c. potential. Applicants have discovered that dopants may be selectively added to the liquid crystalline material to minimize the effects of these electrochemical processes. For example, Applicants have found that the rate of staining of the electrodes by insoluble material may be reduced by adding a chemical species capable of reacting with the initial electrochemical product. In the case of 60% mole MBBA and 40% mole EBBA purified to 99.0%, p-hydroquinone may be added in concentrations of 1% or less to significantly reduce the rate of staining of the active area of the cells. Other dopants, such as 2,2'4,4'-tetrahydroxybenzophenone; 2,4-dihydroxybenzophenone; 2-hydroxy-4-methoxybenzophenone; and benzoin may be used. Composition MBBA, purified to a level in excess of 99.5% and having from ½ to 2% by weight of p-n-butylaniline added thereto, is currently being lifetested and after more than 2500 hours of operation at 15 volts d.c., no appreciable degradation in display characteristics has been observed.

Applicants have also discovered that d.c. operation may be enhanced by preparing the electrodes so as to enhance electrical charge injection such as, for example, by forming an adsorbed surface layer on the electrodes. The adsorbed layer may be formed by washing the electrodes in dichromate cleaning solution. It is believed that washing the electrodes in this cleaning solution forms an adsorbed layer of heavy metal ions on the electrodes and thus requires less percentage of impurities to be added to the nematic liquid crystalline material to enable operation at low d.c. voltage excitation. In EXAMPLE 5, a relatively pure (99.5%) composition of 60% MBBA and 40% EBBA was utilized. With no adsorbed layer on the electrodes, the display failed to scatter light at 15 volts d.c. However, using the same material, EXAMPLE 6, but cleaning the electrodes with dichromate cleaning solution, the display worked satisfactorily. The conductivity of the dichromate-cleaned cells was measured to be 8–10 times that present in cells where no adsorbed layer was formed.

EXAMPLE 5

Pittsburg Plate Glass (PPG) was precleaned to remove traces of blue protective coating by washing in Nochromix for 15 minutes. The glass was rinsed overnight in deionized water and etched with Zn-NCl to define a 1 square centimeter electrode. After etching, the glass was recleaned in Nochromix for 15 minutes, rinsed in deionized water for one hour, rinsed in isopropylalcohol (IPA) and then soaked in IPA for five minutes followed by an IPA rinse. The glass was then dried with nitrogen. The glass was then put on a hot plate and heated to 95° C. The glass was wiped with acetone and then let set for ten minutes. A 12 $\mu$ m display cell was filled with a pure (99.5%) mixture of 60% MBBA and 40% EBBA and the conductivity and contrast measured. A voltage of 15 V d.c. was impressed across the cell, but no dynamic scattering was observed. The conductance and contrast ratio of this cell measured $10^{-10}$ $\Omega^{-1}$ $cm^{-1}$ and 1:1 respectively.

EXAMPLE 6

PPG glass was precleaned in Dichromate sulfuric acid cleaner for 15 minutes, rinsed one hour in deionized water, rinsed in IPA and dried with nitrogen. After etching and definition of electrodes, the glass was recleaned in chromic acid for 15 minutes, rinsed in deionized water one hour, rinsed in IPA and soaked in IPA for five minutes. The glass was again rinsed in IPA and dried with nitrogen. A 12 $\mu$m cell was filled with the same material as in EXAMPLE 5 and tested. Dynamic scattering was observed with 15 V d.c. applied. The current density and contrast were measured to be 6$\mu$A/cm$^2$ and 5.6:1 respectively.

A number of other binary mixtures have been tested for low d.c. voltage operation (7–20 V d.c.) in accordance with the present invention, for example, controlling the purity level of the material. Exemplary mixtures that were initially prepared to be pure to the level of 98.0–99.5% by weight and tested in a display cell are listed in TABLE II. The percentage of each material is not included since any ratio of the two materials, from 0–100 to 100–0% may be utilized, it being understood that the primary purpose for forming a mixture is to control the nematic temperature range, for example, to include room temperature. Also, it is obvious that the materials in TABLE II alternatively could have been purified to a high level (in excess of 99.5%) and dopants added to effect the desired current density.

TABLE II

Examples of low d.c. voltage room temperature liquid crystal compositions.
1. p-methoxybenzylidene-p-n-butylaniline p-(p-ethoxyphenylazo) phenyl heptanoate
2. p-ethoxybenzylidine-p-n-butylaniline p-(p-ethoxyphenylazo) phenyl heptanoate
3. butyl-p-(p-ethoxyphenoxycarbonyl) phenyl carbonate p-(p-ethoxyphenylazo) phenyl heptanoate
4. p-(p-ethoxyphenylazo) phenyl heptanoate p-(p-ethoxyphenylazo) phenyl undecylenate
5. p-methoxybenzylidene-p-n-butylaniline p-ethoxybenzylidene-p-n-butylaniline
6. p-methoxybenzylidene-p-n-butylbenzene p-methoxybensylidene-p-aminophenyl butyrate 7. p-ethoxybenzylidene-p-n-butylaniline p-methoxybenzylidene-p-aminophenyl butyrate
8. p-ethoxybenzylidene-p-n-butylaniline bis-(4-n-octyloxybenzal)-2-chloro-1,4-phenylenediamine
9. p-methoxybenzylidene-p-aminophenyl butyrate bis-(4'-n-octyoxybenzal)-Z-chloro-1,4-phenylenediamine
10. p-methoxybenzylidene-p-n-butylbenzene bis-(4'-n-octyloxybenzal)-2-chloro-1,4-phenylenediamine
11. p-ethoxybenzylidene-p-n-butylaniline p-propoxybenzylidene-p-n-butylaniline While specific examples of liquid crystal compositions that exhibit dynamic scattering in response to low d.c. excitation voltages have been given, any nematic liquid crystal composition, that is, any material having a state or phase intermediate between that of the anisotropic crystal and of the isotropic liquid and which exhibits dynamic scattering, may be utilized in accordance with the teachings of the present invention. Thus, by controlling the impurity level of these materials, a low d.c. voltage device may be effected. By way of example, lyotropic compositions which include a solvent and solute may be utilized in low voltage display devices. The types of molecules which will form the required lyotropic mesophase are usually of an elongated, relatively straight and in some cases flattened structure. This shape favors the parallel arrangement of molecules characteristic of the nematic mesophase. In addition, these compounds preferably are nematogenic at room temperature, for example, in the range of from 15° C to 30° C. Exemplary solutes are as follows:

a. butyl-p-(p-ethoxyphenoxycarbonyl) phenyl carbonate,

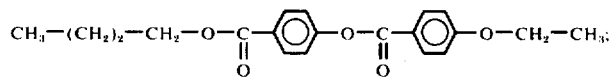

b. p-(p-ethoxyphenylazo) phenyl heptanoate,

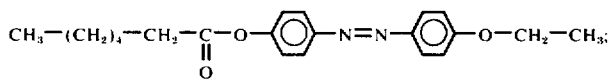

c. p-[N-(p-methoxybenzylidene)amino]phenyl acetate,

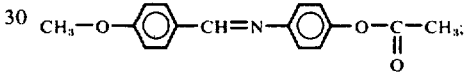

d. p-(p-ethoxyphenylazo) phenyl undecylenate,

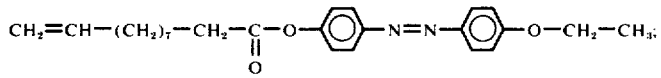

e. 4,4'-bis(heptyloxy)azoxybenzene,

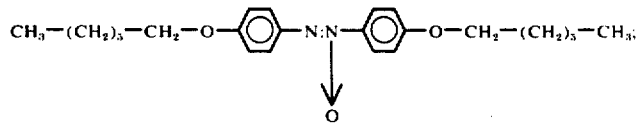

f. p-(p-ethoxyphenylazo) phenyl hexanoate,

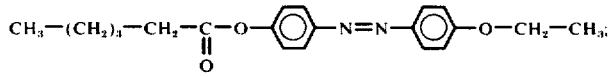

g. 4,4'-bis(pentyloxy) azoxybenzene,

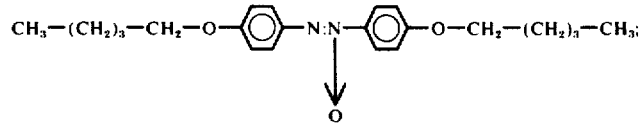

h. 4,4'-bis(hexyloxy) azoxybenzene,

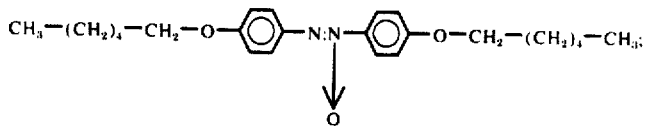

i. 4,4'-dibutoxyazoxybenzene,

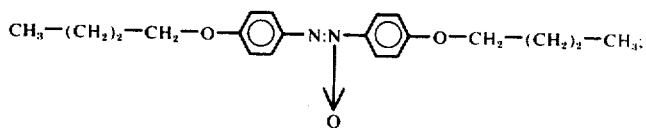

j. 4,4'-dipropoxyazoxybenzene,

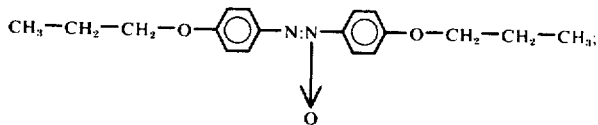

k. p-[N-(P-octyloxybenzylidene)amino] n-butyl benzene,

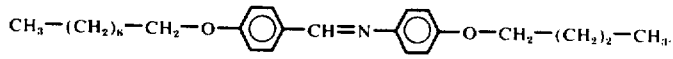

Other suitable solute molecules include:
4 - [(p - hexyloxycarbonyloxybenzylidene)amino] - 1 - pentyloxybenzene,
N-[p-pentyloxycarbonyloxy)benzylidene]-p-anisidene,
p-[(p-butoxyphenyl)axo]phenyl butyl carbonate,
p-(p-ethoxyphenylazo)phenyl valerate,
p-[(p-ethoxybenzylidene)amino]phenyl acetate,
ethyl-p-[(p-methoxybenzylidene)amino]cinnamate,
ethyl-p-[(p-ethoxybenzylidene)amino]cinnamate,
p-[(p-methoxybenzylidene)amino]phenyl benzoate,
4,4'-azoxydianisole,
4,4'-azoxydiphenetole,
N-p-methoxybenzylidene-p-phenylazoaniline,
4,4'-azodiphenetole,
p-methoxycinnamic acid,
N,N'-di(p-methoxybenzylidene) a,a'-bi-p-toluidine,
p-anisalazine,
4-acetoxy-3-methoxycinnamic acid.

Preferred solute molecules are those compounds (a) and (c) above, and more preferably a mixture of about eighty weight percent (a) and about twenty weight percent (c).

Suitable solvent molecules for use with the present invention can be of the general formula:

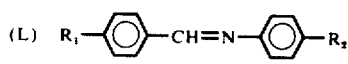

wherein $R_1$ and $R_2$ are alkyl radicals, the alkyl radicals having from one to five carbon atoms. Preferably the alkyl radicals have a straight chain or have a single methyl group branching therefrom. A preferred solvent is one wherein $R_1$ is methyl and wherein $R_2$ is n-butyl, i.e., (m) p-[N-(p-methylbenzylidene)amino]n-butyl benzene,

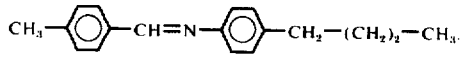

Most preferably about sixty mole percent of the solvent (m) is mixed with forty mole percent of the aforementioned preferred mixture of (a) and (c) to yield a lyotropic nematic mesomorphic composition which exhibits the nematic mesophase within the temperature range as follows:

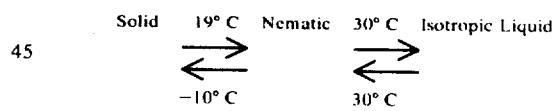

Other molecules exhibiting the long straight flattened structure and having a melting point preferably below room temperature can also be utilized within the purview of the present invention.

Further, ternary mixtures of nematic liquid crystal compositions may be prepared to operate with a long lifetime under low d.c. voltage excitation at room temperature. Examples of such compositions include the materials set forth in TABLE III.

TABLE III

| Material. Weight Percent | | | Crystal to Mesomorphic Temperature | Mesomorphic to Isotropic Temperature |
|---|---|---|---|---|
| *A | *B | *C | | |
| 65% | 15% | 20% | −6° C | 105° C |
| 50% | 35% | 15% | −9° C | 105° C |
| 50% | 30% | 20% | −8° C | 110° C |
| 50% | 25% | 25% | 8° C | 112° C |
| 45% | 35% | 20% | −10° C | 110° C |
| 45% | 30% | 25% | 10° C | 112° C |
| 40% | 40% | 20% | −12° C | 110° C |
| 40% | 35% | 25% | −15° C | 115° C |
| 40% | 30% | 30% | 13° C | 120° C |

TABLE III-continued

| Material, Weight Percent | | | Crystal to Mesomorphic Temperature | Mesomorphic to Isotropic Temperature |
|---|---|---|---|---|
| *A | *B | *C | | |
| 35% | 40% | 25% | 0° C | 113° C |
| 31% | 31% | 38% | 14° C | 118° C |

The response characteristics of the compositions tested in a 1 mil electro-optical display cell at 25° C are summarized in TABLE IV.

TABLE IV

| Material | | | Applied Voltage | Rise Time | Decay | Threshold Voltage | Contrast Ratio |
|---|---|---|---|---|---|---|---|
| *A | *B | *C | V d.c. | msec | msec | volts d. c. | Maximum |
| 40 | 35 | 25 | 60 | 5 | 5 | 7 | 30:1 |
| | | | 40 | 7 | 10 | | |
| | | | 26 | 10 | 10 | | |
| 65 | 15 | 20 | 60 | 5 | 5 | 6.5 | 20:1 |
| | | | 40 | 20 | 20 | | |
| 50 | 30 | 20 | 60 | 5 | 75 | | |
| | | | 40 | 5 | 60 | | |
| | | | 20 | 20 | 70 | | |
| 31 | 31 | 38 | 60 | 18 | 70 | | |
| | | | 40 | 20 | 70 | | |
| | | | 20 | 30 | 100 | | |
| 35 | 40 | 25 | 80 | 3 | 80 | 6.5 | 40:1 |
| | | | 60 | 4 | 70 | | |
| | | | 40 | 7 | 80 | | |
| | | | 20 | 30 | 90 | | |
| 40 | 30 | 30 | 80 | 6 | 80 | | |
| | | | 60 | 6 | 75 | | |
| | | | 40 | 10 | 70 | | |
| | | | 30 | 30 | 70 | | |
| | | | 20 | 35 | 85 | | |

*Material A is 4-ethoxybenzylidene-4'-n-butylaniline
Material B is 4-methoxybenzylidene-4'-aminophenyl butyrate
Material C is bis-(4'-n-octyloxybenzal)-2-chloro-1,4-phenylenediamine In addition, compositions comprising a mixture of smectic-nematic liquid crystal materials may be prepared in accordance with the present invention to contain conductivity-affecting impurities. Exemplary compositions are set forth in TABLE V.

TABLE V

| Example No. | *Composition, Weight % | | Crystal to Mesomorphic Temperature | Mesomorphic to Isotropic Temperature |
|---|---|---|---|---|
| 1 | 20% C | 80% A | 72°C | 111°C |
| 2 | 40% C | 60% A | 71°C | 108°C |
| 3 | 60% C | 40% A | 58°C | 85°C |
| 4 | 80% C | 20% A | 28°C | 62°C |
| 5 | 20% B | 80% A | 58°C | 112°C |
| 6 | 40% B | 60% A | 55°C | 106°C |
| 7 | 60% B | 40% A | 59°C | 95°C |
| 8 | 80% B | 20% A | 35°C | 89°C |
| 9 | 90% B | 10% A | 30°C | 78°C |
| 10 | 60% B | 40% D | 67°C | 96°C |
| 11 | 80% B | 20% D | 43°C | 90°C |
| 12 | 10% D | 90% C | 19°C | 49°C |
| 13 | 20% D | 80% C | 22°C | 55°C |

Figure 7:
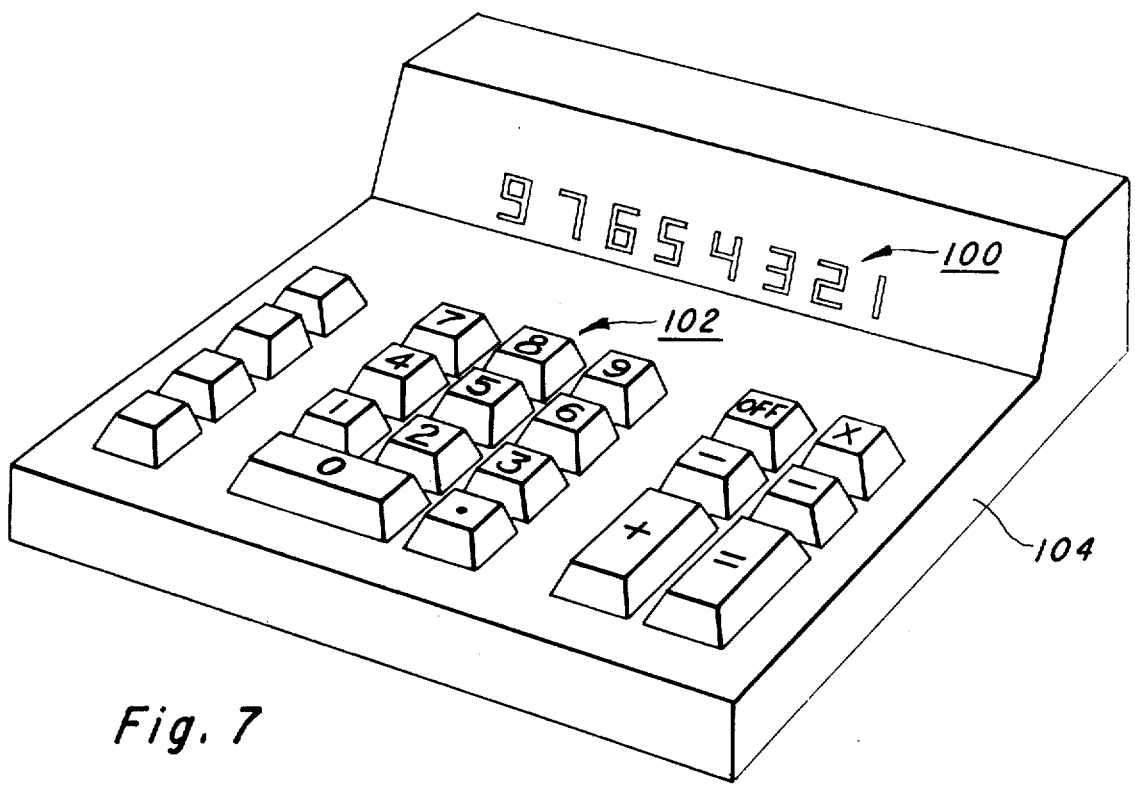
FIG. 7 is a pictorial illustration of an electronically dimmable mirror.

Examples of materials utilized:
A - 4,4'-Bix(heptyloxy)azoxybenzene
B - p-ethoxybenzylidene-p-n-butylaniline
C - p-methoxybenzylidene-p-n-butylaniline
D - ethyl p-hexyloxybenzol-p-aminocinnamate With reference to FIG. 7, there is depicted an illustrative embodiment of the invention in a compact calculator. The invention is particularly useful in miniature portable calculators that depend upon batteries for operation. A liquid crystal display panel is shown generally at 100. The panel includes a liquid crystal composition in which the purity level is controlled to enable d.c. operation in accordance with the present invention. Display panels similar to FIGS. 1–3 may, for example, be utilized. If desired, an adsorbed layer may be formed on the electrodes to further enchance d.c. operation also. Preferably, horizontal alignment of the molecules of the liquid crystal composition is effected. A keyboard is shown at 102. The keyboard and associated electtronic circuitry required for the calculator functions are housed in a suitable casing 104. The circuitry required for a calculator is well-known in the art and need not be described further herein. The transmissive or reflective display panel 100 may utilize ambient light for display purposes or may be artificially lighted, if desired.

Figure 8:
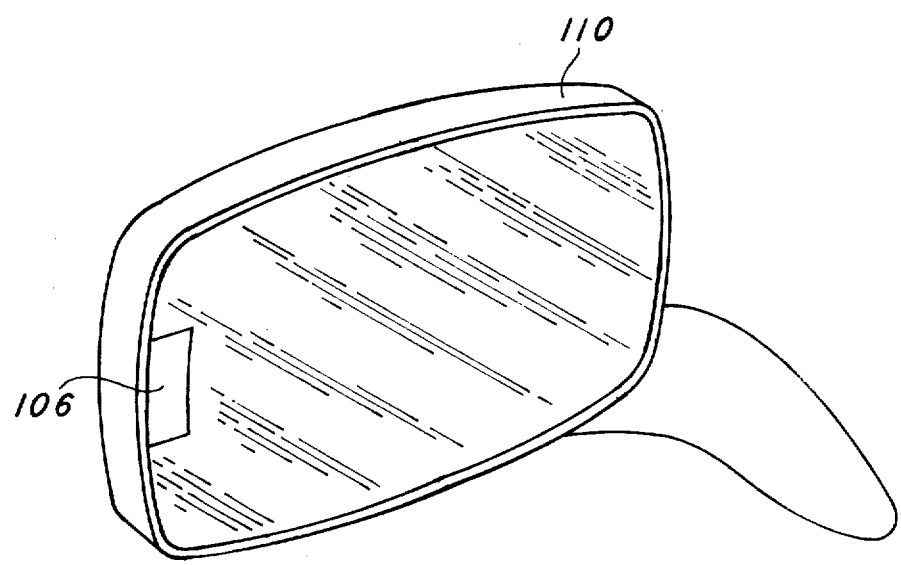

With reference to FIG. 8, an electronically dimmable mirror is depicted generally at 108. The mirror includes a suitable housing 110. This mirror is particularly well-suited for use as a side rear view mirror on an automotive vehicle since it utilizes a liquid crystal composition directly compatible with the 12 volts d.c. generally available from the vehicle battery. The mirror includes a display panel similar to FIG. 3. In operation, the light from an automobile approaching from the rear would pass through the liquid crystal composition 50 undisturbed and would be reflected by refective coating 90 to the eye of the driver. When the light intensity from the approaching car reaches a predetermined level, electronic sensing means 106, mounted, for example, on the periphery of the mirror, enables application of d.c. potential across the composition 50. This produces dynamic scattering and thus diffuses some of the light thereby reducing glare. Sensing means, such as photo-detectors and d.c. voltage switching circuits, are well-known in the art and a further explanation of such devices is not required. Manual operation by a switch inside the car is also feasible. In this embodiment, the electrodes preferably entirely cover both faces of the liquid crystal composition so that substantially all of the composition scatters a portion of the incident light in response to an excitation voltage.

Other embodiments of a d.c. liquid crystal display panel in an automotive vehicle are readily apparent. For example, the display could be used for dashboard indicators and displays of the segmented numeric or alphanumeric type for the speedometer, clock, etc. Also, they could indicate one of a limited set of messages by energizing one wire, such as HOT or COLD. Warning indicators could be embedded directly in the driver's field of view in the windshield, i.e., FASTEN SEAT BELT. Additionally, a fail-safe display could be used that obliterates a message until current is interrupted, such as ALTERNATOR or BRAKES. Due to the extremely low power dissipation, the liquid crystal composition could be used for frostable windows for privacy or to reduce sun glare.

It should be understood, with reference to automotive applications that, depending upon the temperature range that the composition exhibits the mesomorphic state, means may be required to heat the display in extremely cold weather. Compositions are available, however, that are operative in the range of, for example, 5° F to 248° F; with such compositions only minimal heating would be required.

In addition to automotive applications, a liquid crystal display is extremely advantageous in environments where a high intensity ambient light exists, as in a airplane cockpit in sunlight. Since the liquid crystal display may be fabricated to utilize ambient light, the greater the intensity of ambient light, the greater the intensity of the display. Thus, displays having sufficient contrast ratio, even in intense ambient light, may be produced.

Many of the liquid crystalline materials tested by Applicants were produced in accordance with procedures described in EXAMPLES 1 and 2 above. That is, the materials were initially purified to a level in the range of 98 to 99.5%. To date Applicants have not been able to specifically identify the exact impurities that are operative to enable low d.c. voltage thresholds and long operating lifetimes. For example, in the case where dopants are added to EBBA or MBBA or where these materials are prepared to be 98 to 99.5% pure with the two major impurities being aldehyde or amine, Applicants believe that the dopants added or the major impurities existing in the 98 to 99.5% pure materials are not necessarily the dopants most important for successful operation. In other words, it is believed that trace amounts of impurities not yet identified are contained in the materials and may be responsible for the low voltage operation. In any event, materials prepared as outlined herein are operative at low d.c. voltage levels. In addition, the exact nature of the impurities (or dopants where the composition is initially purified to a level in excess of 99.5% pure) is not understood. The composition is of relatively high resistivity and does not readily accept charge carriers introduced by the electrodes. Thus, the impurites may in part add ions to the composition, enhancing charge transfer, or may make the composition more receptive or more efficient in transferring charge carriers introduced by the electrodes. In any event, the remaining impurites or added dopants, as the case may be, are effective to increase the conductivity of the mesomorphic composition.

Although specific embodiments have been described herein, it will be apparent to persons skilled in the art the various modifications to the details of construction that may be made without departing from the scope or spirit of the present invention. For example, mixtures of nematic liquid crystals of different percentages than have been shown herein or different namatic liquid crystals from those which have been specifically identified by Applicants may be utilized and appropriate conductivity affecting dopants added to provide the advantageous features of the present invention.

What is claimed is:

1. An electro-optic display device comprising in combination:

a first optically transmissive substrate having an optically transmissive and electrically conductive region on one surface thereof, a second substrate having an electrically conductive region on one surface thereof, said first and second substrates spaced apart in a substantially parallel relationship such that said conductive regions face one another, a body of a mesomorphic liquid crystal composition substantially filling the space between said first and second substrates, said mesomorphic liquid crystal composition comprising liquid crystalline material in an amount from 98.0 to 99.5% by weight and electrical conductivity modifiers dispersed in said liquid crystalline material in an amount from 0.5 to 2.0% by weight of said mesomorphic liquid crystal composition, said mesomorphic liquid crystal composition being effective to scatter incident light in response to an electric field applied thereacross, and said conductivity modifiers dispersed in said liquid crystalline material cooperating therewith to effect a current density in said mesomorphic liquid crystal composition in the range of from 0.5 to 3.0 $\mu a/cm^2$ at 15 volts d.c., and an adsorbed layer of ion donor material formed on said conductive regions for enhancing electrical charge injection in sadi mesomorphic liquid crystal composition.

* * * * *